(12) United States Patent  
Takada et al.

(10) Patent No.: US 8,483,744 B2  
(45) Date of Patent: Jul. 9, 2013

(54) COMMUNICATION APPARATUS, COMMUNICATION SYSTEM, NOTIFICATION METHOD, AND PROGRAM PRODUCT

(75) Inventors: Kazuo Takada, Tokyo (JP); Isao Soma, Saitama (JP); Seiji Kuroda, Kanagawa (JP); Yasuharu Ishikawa, Kanagawa (JP); Yoshihiro Yoneda, Kanagawa (JP); Naoki Miyabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 940 days.

(21) Appl. No.: 12/502,760

(22) Filed: Jul. 14, 2009

(65) Prior Publication Data

US 2010/0009711 A1      Jan. 14, 2010

(30) Foreign Application Priority Data

Jul. 14, 2008   (JP) .................. P2008-182183

(51) Int. Cl.  
*H04B 7/00* (2006.01)
(52) U.S. Cl.  
USPC .......................................... 455/525; 455/90.1
(58) Field of Classification Search  
USPC .......................................................... 455/525  
See application file for complete search history.

(56) References Cited

U.S. PATENT DOCUMENTS

| | | | | |
|---|---|---|---|---|
| 5,732,347 A | * | 3/1998 | Bartle et al. | 455/421 |
| 6,018,655 A | * | 1/2000 | Bartle et al. | 455/421 |
| 6,078,821 A | * | 6/2000 | Kaschke et al. | 455/507 |
| 6,633,761 B1 | * | 10/2003 | Singhal et al. | 455/436 |
| 6,868,256 B2 | * | 3/2005 | Dooley et al. | 455/41.1 |
| 7,197,308 B2 | * | 3/2007 | Singhal et al. | 455/436 |
| 7,250,612 B2 | * | 7/2007 | Pai-Paranjape et al. | 250/461.1 |
| 7,254,400 B1 | * | 8/2007 | Sakakura | 455/456.1 |
| 7,395,029 B2 | * | 7/2008 | Sasai et al. | 455/41.2 |
| 7,529,935 B2 | * | 5/2009 | Saito et al. | 713/168 |
| 7,551,593 B2 | * | 6/2009 | Haller et al. | 370/338 |

(Continued)

FOREIGN PATENT DOCUMENTS

| | | |
|---|---|---|
| JP | 2004-297814 | 10/2004 |
| JP | 2004-364145 | 12/2004 |

(Continued)

OTHER PUBLICATIONS

Japanese Patent Office, Office Action, issued in connection with Japanese Application No. 2011-2224707, dated Oct. 12, 2011. (28 pages).

(Continued)

*Primary Examiner* — Hai V Nguyen  
(74) *Attorney, Agent, or Firm* — K&L Gates LLP

(57) ABSTRACT

There is provided a communication apparatus including: a first communication unit having a first communication range; a second communication unit having a second communication range wider than the first communication range; a control unit which transmits a request signal for starting communication via the second communication unit from the first communication unit to another communication apparatus, and transmits authentication information from the second communication unit to the another communication apparatus in the case where it is determined that communication with the another communication apparatus via the second communication unit is possible based on a response signal after the first communication unit receives the response signal in response to the request signal; and a notification unit which notifies a user after the second communication unit receives a result of authentication based on the authentication information.

17 Claims, 12 Drawing Sheets

U.S. PATENT DOCUMENTS

| | | | |
|---|---|---|---|
| 7,580,865 B2* | 8/2009 | Yoshida | 705/26.1 |
| 7,606,570 B2* | 10/2009 | Karaoguz et al. | 455/442 |
| 7,668,754 B1* | 2/2010 | Bridgelall | 705/26.9 |
| 7,865,474 B2* | 1/2011 | Nagoya | 707/648 |
| 7,903,591 B2* | 3/2011 | Wakamatsu | 370/282 |
| 7,920,842 B2* | 4/2011 | Martin et al. | 455/404.1 |
| 7,945,704 B2* | 5/2011 | Singh et al. | 710/5 |
| 7,962,126 B2* | 6/2011 | Haung et al. | 455/412.2 |
| 7,962,164 B2* | 6/2011 | Karaoguz et al. | 455/515 |
| 8,059,605 B2* | 11/2011 | Yeou et al. | 370/332 |
| 8,107,625 B2* | 1/2012 | Boland et al. | 380/37 |
| 8,244,920 B2* | 8/2012 | Singh et al. | 710/5 |
| 8,285,266 B2* | 10/2012 | Cui | 455/415 |
| 8,365,138 B2* | 1/2013 | Iborra et al. | 717/104 |
| 2003/0055792 A1* | 3/2003 | Kinoshita et al. | 705/67 |
| 2003/0193910 A1* | 10/2003 | Shoaib et al. | 370/331 |
| 2004/0064378 A1* | 4/2004 | Yoshida | 705/26 |
| 2004/0173674 A1* | 9/2004 | Matsuura | 235/380 |
| 2004/0192211 A1* | 9/2004 | Gallagher et al. | 455/67.11 |
| 2004/0203384 A1* | 10/2004 | Sugikawa et al. | 455/41.2 |
| 2004/0218605 A1* | 11/2004 | Gustafsson et al. | 370/395.2 |
| 2004/0242250 A1* | 12/2004 | Sasai et al. | 455/502 |
| 2005/0119001 A1* | 6/2005 | Watanabe | 455/436 |
| 2006/0094402 A1* | 5/2006 | Kim | 455/411 |
| 2006/0111111 A1* | 5/2006 | Ovadia | 455/439 |
| 2006/0148451 A1* | 7/2006 | Narasimha | 455/411 |
| 2007/0275709 A1* | 11/2007 | Lei | 455/421 |
| 2007/0291699 A1* | 12/2007 | Lee et al. | 370/332 |
| 2008/0119187 A1* | 5/2008 | Gallagher et al. | 455/436 |
| 2008/0232338 A1* | 9/2008 | Ji et al. | 370/338 |
| 2009/0014519 A1* | 1/2009 | Singh et al. | 235/437 |
| 2009/0168722 A1* | 7/2009 | Saifullah et al. | 370/331 |
| 2009/0208013 A1* | 8/2009 | Watanabe et al. | 380/272 |
| 2009/0210532 A1* | 8/2009 | Lim et al. | 709/226 |
| 2009/0216802 A1* | 8/2009 | Nagoya | 707/104.1 |
| 2009/0233602 A1* | 9/2009 | Hughes | 455/436 |
| 2009/0270105 A1* | 10/2009 | Kakumaru | 455/436 |
| 2010/0014463 A1* | 1/2010 | Nagai et al. | 370/328 |
| 2010/0040021 A1* | 2/2010 | Aso et al. | 370/331 |
| 2010/0069035 A1* | 3/2010 | Johnson | 455/404.1 |
| 2010/0265880 A1* | 10/2010 | Rautiola et al. | 370/328 |
| 2011/0302342 A1* | 12/2011 | Singh et al. | 710/105 |

FOREIGN PATENT DOCUMENTS

| | | |
|---|---|---|
| JP | 2005-167946 | 6/2005 |
| JP | 2006-14076 | 1/2006 |
| JP | 2006-074295 | 3/2006 |
| JP | 2007-74598 | 3/2007 |
| JP | 2008-098893 | 4/2008 |

OTHER PUBLICATIONS

Japanese Office Action for corresponding JP2008-182183 issued on Apr. 13, 2010.

* cited by examiner

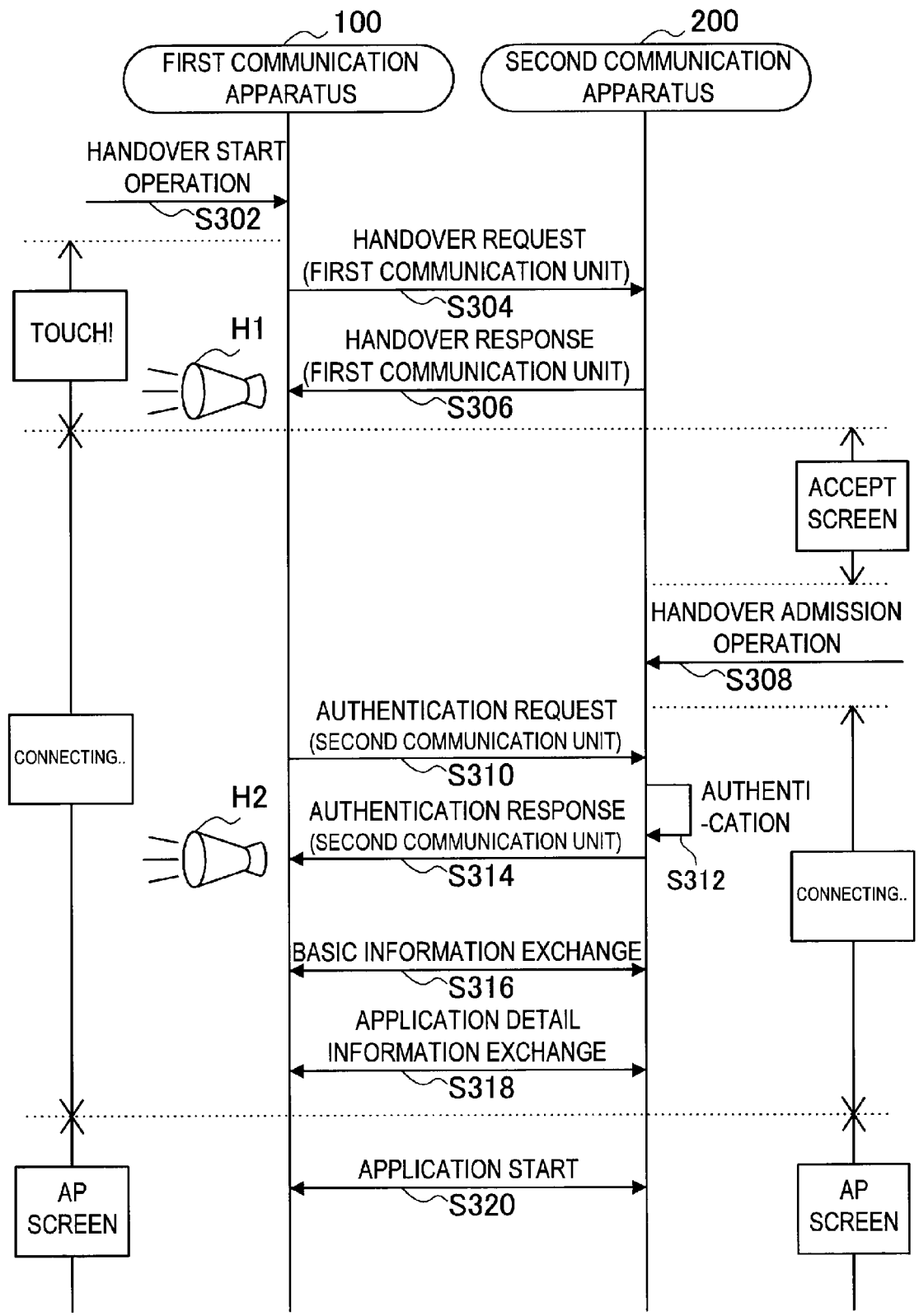

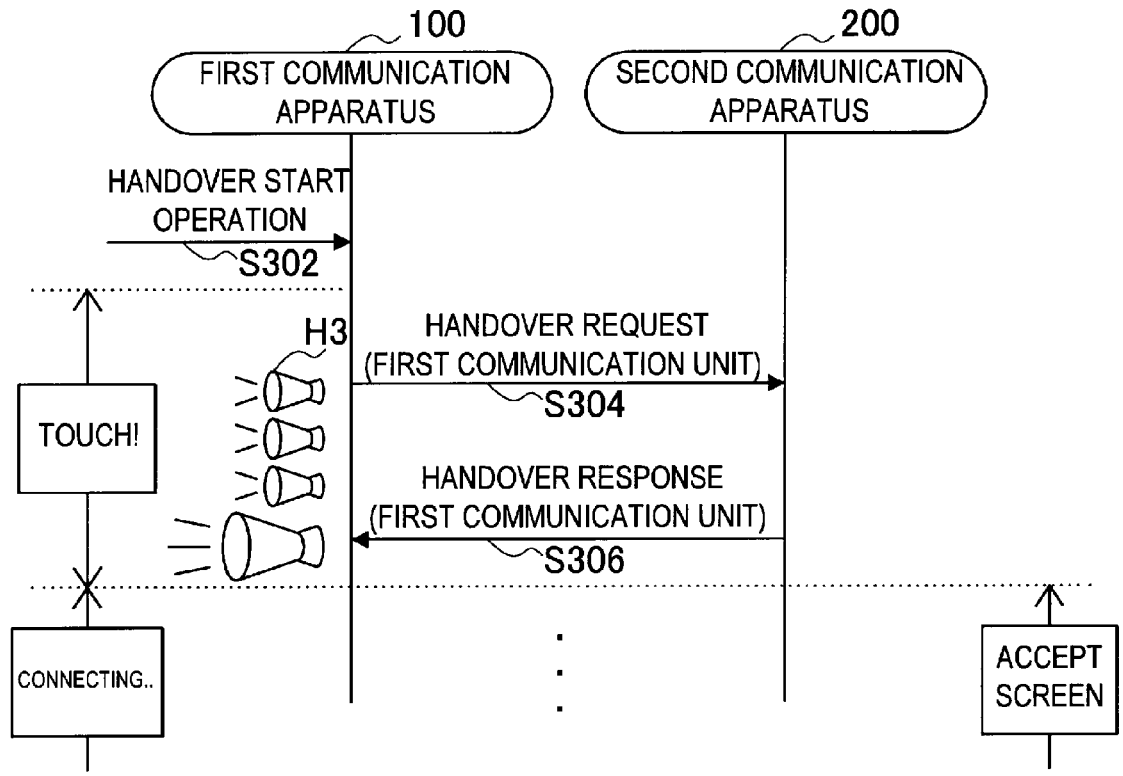
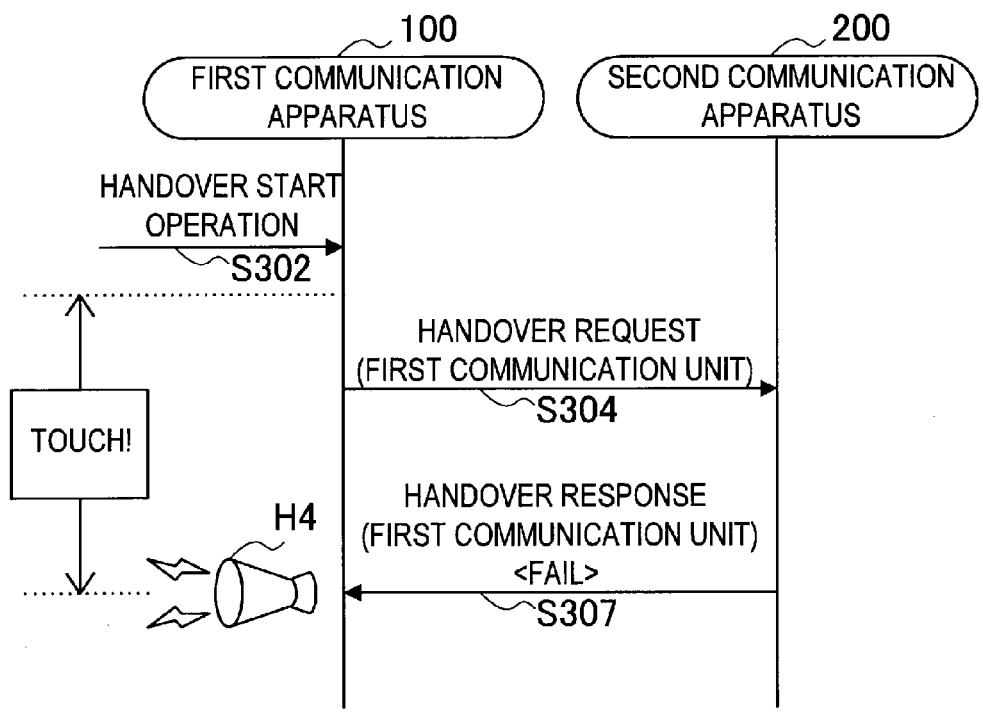

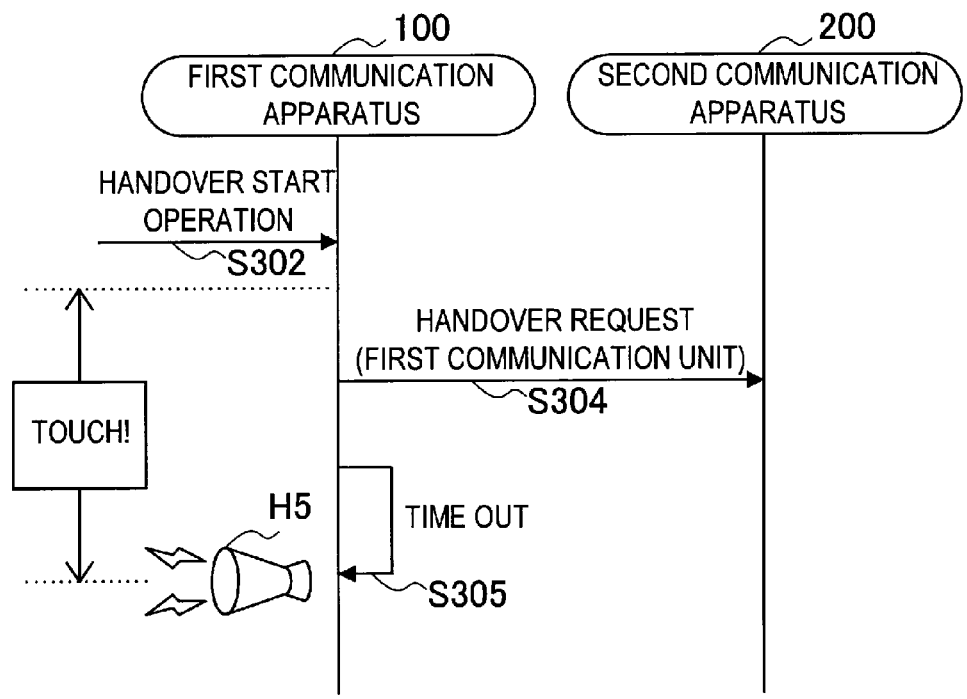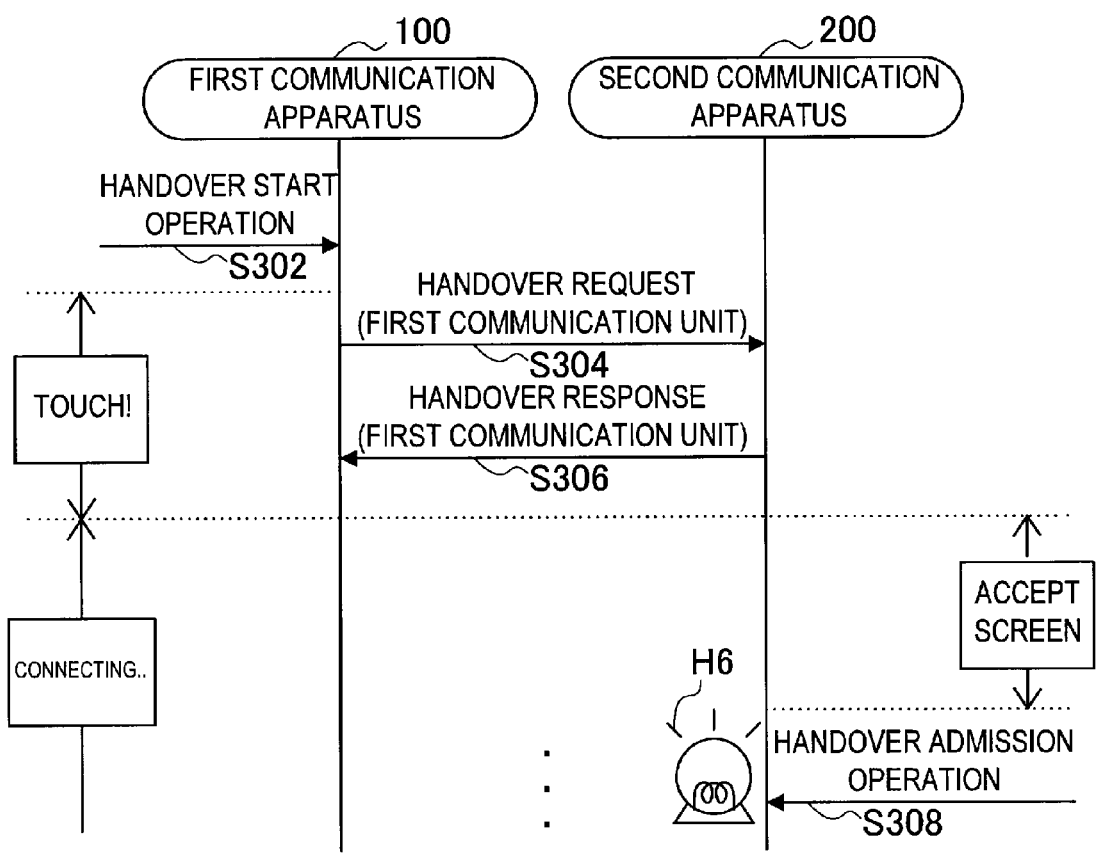

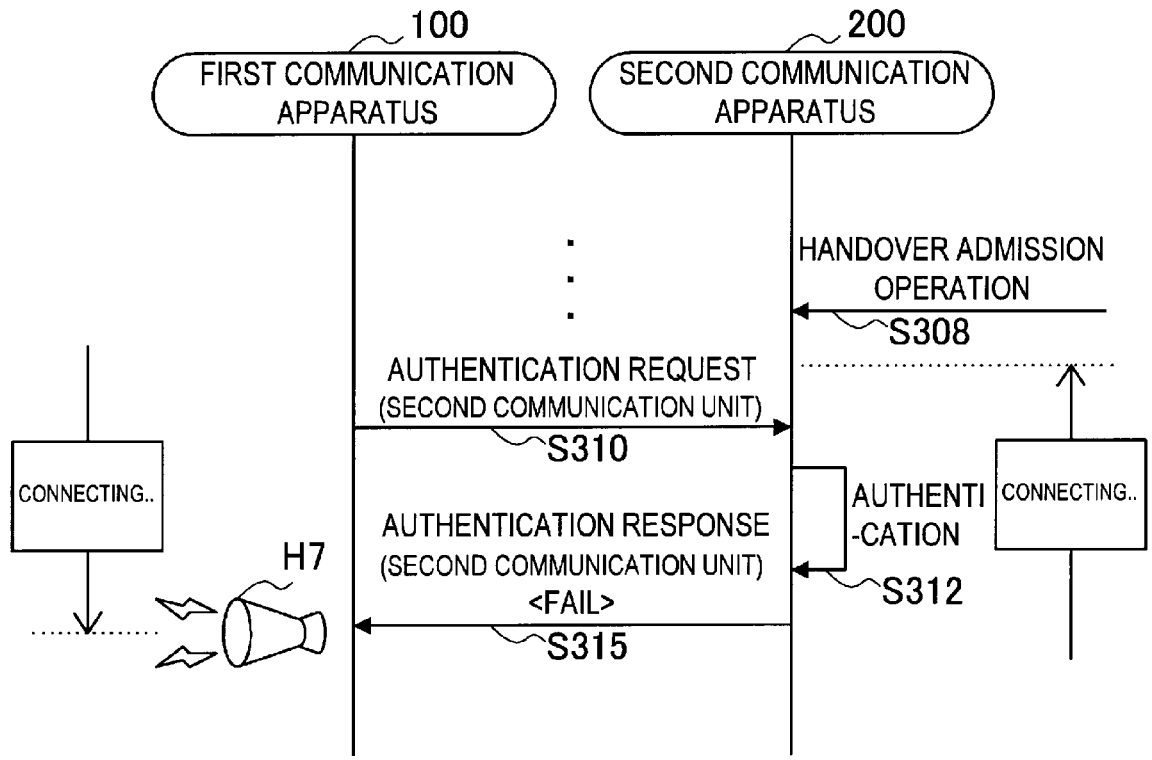
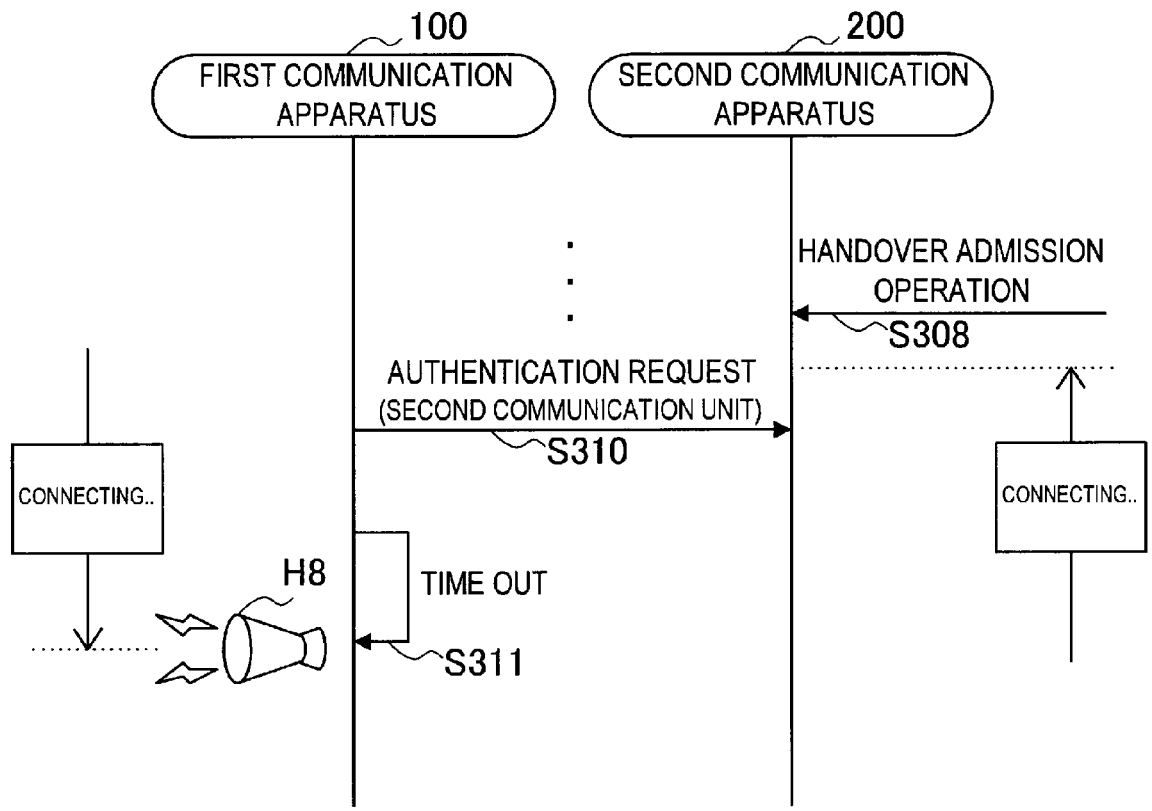

COMMUNICATION APPARATUS, COMMUNICATION SYSTEM, NOTIFICATION METHOD, AND PROGRAM PRODUCT

CROSS REFERENCES TO RELATED APPLICATIONS

The present application claims priority to Japanese Patent Application JP 2008-182183 filed in the Japan Patent Office on Jul. 14, 2008, the entire contents of which being is incorporated herein by reference.

BACKGROUND

The present application relates to a communication apparatus, a communication system, a notification method, and a program product.

In recent years, wireless communication functions are mounted on many electronic devices, and correspondingly, various wireless communication standards have been established. Typical examples of personal wireless technologies, for example, include a wireless LAN and the Bluetooth (trademark) (hereinafter, referred as BT). These wireless technologies are used for multifunctional home appliances such as a personal computer (hereinafter, referred as PC), a mobile phone, and a personal digital assistance (hereinafter, referred as PDA), small built-in devices such as a digital camera, and a printer, and the like. Hereinafter, a device equipped with such wireless communication function is referred as a wireless device.

These wireless devices have been in widespread use and have been used in many scenes, and accordingly, user's convenience is improved. On the other hand, unauthorized invasion to wireless devices and security damages such as outflow of personal information have become problematic, and therefore, security enhancement in the wireless devices has been strongly desired.

Under such background, many systems for security enhancement have been provided, and at the same time, it has become a large burden for general users who lack expertise to set proper security settings for each device. Consequently, as one method which is for achieving security setting of wireless devices by a simple operation, there is proposed a working referred as handover in which setting information and the like necessary for authentication is automatically exchanged between devices using a communication method having a narrow communication range, and then, the communication method is switched to a communication method having a wider communication range.

For example, Japanese Patent Application Laid-Open No. 2004-364145 discloses a configuration of handover in which protocol information and the like that can be used by another communication apparatus is exchanged using a first communication means and the communication means is switched to a second communication means using the exchanged protocol information and the like. In addition, Japanese Patent Application Laid-Open No. 2006-14076 discloses a communication system which improves security by performing handover after a session key produced with a random number is encrypted and exchanged. In addition, Japanese Patent Application Laid-Open No. 2007-74598 discloses a method which exchanges protocol information among not less than three devices which support different communication methods and realizes communications by switching a communication method to an optimum one.

SUMMARY

However, in specifications of the handover which have been proposed so far, means for notifying a user of a state of switching from the first communication means to the second communication means is not specified. For example, if a device which performs a handover is a terminal device and the like in which a display screen is provided, it is conceivable to make the terminal device display a state of the handover on the display screen. However, there is a case where a display screen is not provided depending on devices. In addition, when a process time taken to the handover becomes long, for example, in the case where a process of the handover becomes complicated in the future or in the case of achieving advanced security, convenience is impaired if a user has to continue to pay particular attention to a screen.

The present application has been made in view of the above issues, and it is desirable to provide a novel and improved communication apparatus, a communication system, a notification method, and a program product, which are capable of notifying a state of progress of handover without making a user pay particular attention to a screen.

According to an embodiment, there is provided a communication apparatus including: a first communication unit having a first communication range; a second communication unit having a second communication range wider than the first communication range; a control unit which transmits a request signal for starting communication via the second communication unit from the first communication unit to another communication apparatus, and transmits authentication information from the second communication unit to the another communication apparatus in the case where it is determined that communication with the another communication apparatus via the second communication unit is possible based on a response signal after the first communication unit receives the response signal in response to the request signal; and a notification unit which notifies a user after the second communication unit receives a result of authentication based on the authentication information.

According to such a configuration, in a handover situation, the request signal for starting communication via the second communication unit is first transmitted from the first communication unit to another communication apparatus. Then, the first communication unit receives a response signal transmitted from the another communication apparatus in response to the request signal. After that, the control unit determines whether or not communication with the another communication apparatus via the second communication unit is possible based on the response signal. Then, in the case where the communication with the another communication apparatus via the second communication unit is possible, the second communication unit transmits the authentication information to the another communication apparatus. Then, after the second communication unit receives a result of authentication based on the authentication information, the notification unit, for example, notifies a user using an arbitrary means for stimulating sensory organs of the user such as a visual sense, acoustic sense, and tactile sense.

Furthermore, the notification unit may notify a user after the response signal in response to the request signal is received by the first communication unit.

Furthermore, the notification unit may continuously notify a user after the request signal is transmitted from the first communication unit to the another communication apparatus until the response signal in response to the request signal is received by the first communication unit.

Furthermore, the notification unit may notify a user in different notification patterns depending on availability of communication with the another communication apparatus via the second communication unit, the availability of the communication being determined by the control unit.

Furthermore, the notification unit may continuously notify a user after the authentication information is transmitted from the second communication unit to the another communication apparatus until the result of the authentication based on the authentication information is received by the second communication unit.

Furthermore, the notification unit may notify a user in different notification patterns depending on whether the authentication based on the authentication information succeeded or not or depending on the type of success or failure of the authentication.

Furthermore, the communication apparatus may further include an application unit which provides a user with an application service using communication with the another communication apparatus via the second communication unit in the case where the authentication based on the authentication information succeeds, and the notification unit may notify the user in the case where the provision of the application service is started by the application unit.

Furthermore, the notification unit may notify a user in the case where the provision of the application service by the application unit is not able to be started due to an error after the authentication based on the authentication information succeeds.

Furthermore, the notification unit may notify a user in different notification patterns depending on a communication method specified in the response signal after the response signal in response to the request signal is received by the first communication unit.

According to another embodiment, there is provided a communication apparatus including: a first communication unit having a first communication range; a second communication unit having a second communication range wider than the first communication range; a control unit which transmits a response signal in response to a request signal from the first communication unit to the another communication apparatus after the first communication unit receives the request signal for starting communication via the second communication unit from the another communication apparatus, and transmits a result of authentication based on authentication information from the second communication unit to the another communication apparatus after the second communication unit receives the authentication information from the another communication apparatus; an authentication unit which authenticates the communication with the another communication apparatus via the second communication unit based on the authentication information and outputs the result of the authentication; and a notification unit which notifies a user after the authentication is performed by the authentication unit based on the authentication information.

Furthermore, the notification unit may continuously notify a user during a carrier wave for detecting a communication party is output from the first communication unit.

Furthermore, the notification unit may notify a user after the first communication unit receives the request signal from the another communication apparatus.

Furthermore, the notification unit may notify a user in different notification patterns depending on whether the authentication performed by the authentication unit based on the authentication information succeeded or not or depending on the type of success or failure of the authentication.

Furthermore, the communication apparatus may further include an operation unit which accepts an operation indicating whether or not communication via the second communication unit is admitted after the response signal is transmitted by the first communication unit, and the notification unit may notify a user after the operation unit accepts the operation which admits the communication via the second communication unit.

According to another embodiment, there is provided a communication system including a communication apparatus of the request side and a communication apparatus of the response side, the communication apparatus of the request side including: a first communication unit of the request side having a first communication range; a second communication unit of the request side having a second communication range wider than the first communication range; a control unit of the request side which transmits a request signal for starting communication via the second communication unit of the request side from the first communication unit of the request side to the communication apparatus of the response side, and transmits authentication information from the second communication unit of the request side to the communication apparatus of the response side in the case where it is determined that communication with the communication apparatus of the response side via the second communication unit of the request side is possible based on a response signal after the first communication unit of the request side receives the response signal in response to the request signal; and a notification unit of the request side which notifies a user after the second communication unit of the request side receives a result of authentication based on the authentication information, and the communication apparatus of the response side including: a first communication unit of the response side capable of communicating with the first communication unit of the request side; a second communication unit of the response side capable of communicating with the second communication unit of the request side; and a control unit of the response side which transmits the response signal from the first communication unit of the response side to the communication apparatus of the request side after the first communication unit of the response side receives the request signal from the communication apparatus of the request side, and transmits the result of the authentication based on the authentication information from the second communication unit of the response side to the communication apparatus of the request side after the second communication unit of the response side receives the authentication information from the communication apparatus of the request side.

According to another embodiment, there is provided a notification method including the steps of: transmitting a request signal for starting communication by a second communication method having a second communication range wider than a first communication range using a first communication method having the first communication range from a first communication apparatus to a second communication apparatus; transmitting a response signal in response to the request signal from the second communication apparatus to the first communication apparatus; determining whether or not the communication by the second communication method with the second communication apparatus is possible based on the response signal in the first communication apparatus; transmitting authentication information from the first communication apparatus to the second communication apparatus in the case where it is determined that the communication by the second communication method is possible; transmitting a result of authentication based on the authentication information from the second communication apparatus to the first communication apparatus; and carrying out a notification for a user after receiving the result of the authentication based on the authentication information in the first communication apparatus.

According to another embodiment, there is provided a computer program product having instructions that when read by a CPU cause an information processing apparatus, which controls a communication apparatus including a first communication unit having a first communication range, a second communication unit having a second communication range wider than the first communication range, and a notification unit which carries out a notification for a user, to perform a function as a control unit which transmits a request signal for starting communication via the second communication unit from the first communication unit to the another communication apparatus, transmits authentication information from the second communication unit to the another communication apparatus in the case where it is determined that communication with the another communication apparatus via the second communication unit is possible based on the response signal after the first communication unit receives a response signal in response to the request signal, and causes the notification unit to carry out a notification for the user after the second communication unit receives a result of authentication based on the authentication information.

According to another embodiment, there is provided a computer program product having instructions that when read by a CPU cause an information processing apparatus, which controls a communication apparatus including a first communication unit having a first communication range, a second communication unit having a second communication range wider than the first communication range, and a notification unit which carries out a notification for a user, to perform a function as a control unit which transmits a response signal in response to the request signal from the first communication unit to the another communication apparatus after the first communication unit receives a request signal for starting communication via the second communication unit from the another communication apparatus, transmits a result of authentication based on the authentication information from the second communication unit to the another communication apparatus after the second communication unit receives authentication information from the another communication apparatus, and causes the notification unit to carry out a notification for the user to after performing the authentication based on the authentication information; and an authentication unit which authenticates the communication with the another communication apparatus via the second communication unit based on the authentication information and outputs the result of the authentication.

As described above, according to the communication apparatus, the communication system, the notification method, and the program product, it is possible to notify a state of progress of handover without making a user pay particular attention to a screen.

Additional features and advantages are described in, and will be apparent from, the following Detailed Description and the figures.

BRIEF DESCRIPTION OF THE FIGURES

FIG. 5 is a sequence diagram showing an example of a handover process flow and a notification process;

FIG. 6 is a sequence diagram showing another example of a notification process;

FIG. 7 is a sequence diagram showing a further different example of the notification process;

FIG. 8 is a sequence diagram showing a further different example of the notification process;

FIG. 9 is a sequence diagram showing a further different example of the notification process;

FIG. 10 is a sequence diagram showing a further different example of the notification process;

FIG. 11 is a sequence diagram showing a further different example of the notification process;

DETAILED DESCRIPTION

Figure 1:
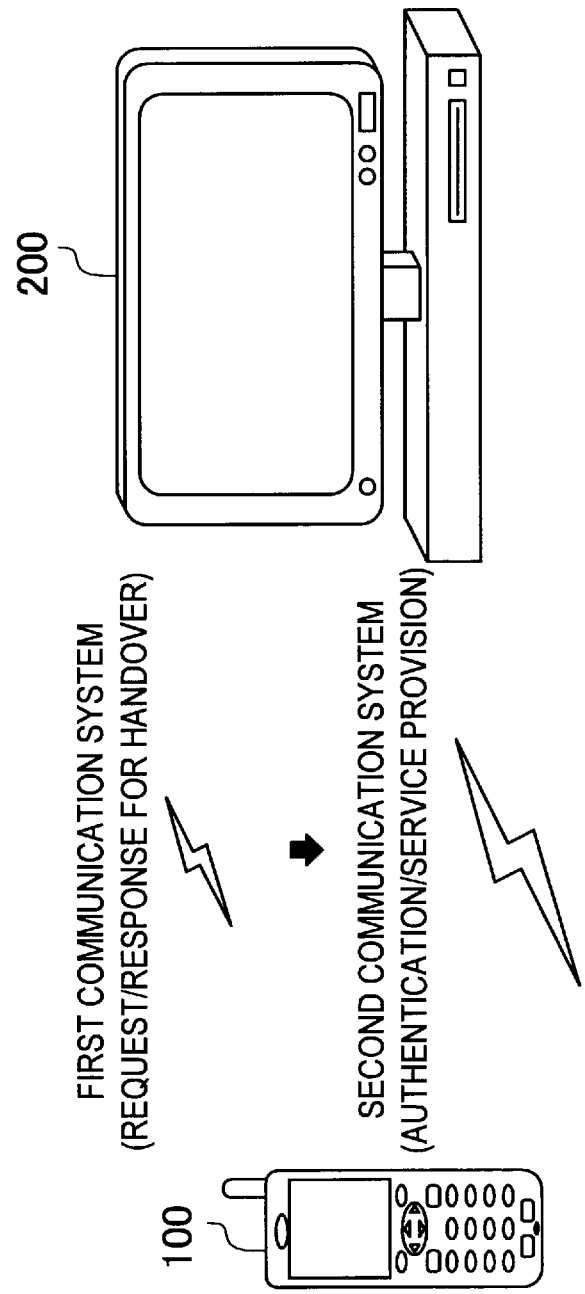
FIG. 1 is a typical view showing outline of a communication system according to an embodiment.

The present application will be described in detail with reference to the appended drawings according to an embodiment. Note that, in this specification and the appended drawings, structural elements that have substantially the same function and structure are denoted with the same reference numerals, and repeated explanation of these structural elements is omitted.

The embodiments will be described with the following sections [1] to [3]:

[1] Outline of Communication System;

[2] Basic Configuration Example of Communication Apparatuses; and

[3] Example of Handover Process Flow and Notification Process.

[1] Outline of Communication System

First, an outline of the communication system 1 according to an embodiment will be described with reference to FIG. 1.

FIG. 1 is a schematic view showing a communication system 1 according to an embodiment. Referring to FIG. 1, the communication system 1 includes a first communication apparatus 100 and a second communication apparatus 200.

In FIG. 1, there is shown a mobile phone terminal as the first communication apparatus 100 and a video display device as the second communication apparatus 200, however, the first communication apparatus 100 and the second communication apparatus 200 are not limited to such examples. The first communication apparatus 100 or the second communication apparatus 200 may be, for example, a PC, a PDA, a sound reproducing apparatus, an information processing apparatus such as a digital camera, or a wireless communication module connected to such devices and the like.

As shown in FIG. 1, such first communication apparatus 100 and second communication apparatus 200 can communicate with each other by two types of communication methods including a first communication method and a second communication method. The first communication method is typically realized as a proximity communication method which is for communicating between very short distances, for example, a distance of approximately 10 cm. As the first communication method, for example, a non-contact communication method according to the NFC (near field communication) standards can be used.

On the other hand, the second communication method is a communication method capable of communicating in a wider range than the first communication method. The second communication method is typically realized as a relatively high speed communication method with a wider bandwidth than the first communication method. As the second communication method, for example, a communication method such as the wireless LAN and the BT can be used.

In the case where handover is performed in the communication system 1 shown in FIG. 1, setting information for communication by the second communication method is first exchanged using the first communication method between the first communication apparatus 100 and the second communication apparatus 200. Exchange of setting information is performed, for example, through a transmission of a request signal which requests starting handover and a reception of a response signal in response to the request signal.

After that, when the exchange of setting information is completed, authentication is performed between the first communication apparatus 100 and the second communication apparatus 200 using the second communication method. Then, after the authentication using the second communication method succeeds, the handover is finally done, and an application service between the first communication apparatus 100 and the second communication apparatus 200 is started.

At this time, for example, there is a case where a certain amount of time is necessary from a request for handover till completion of handover in case that an authentication process accompanies with high processing cost in order to achieve advanced security, or depending on a specific situation of communication environment, and the like. In addition, there are some possibilities that a handover will fail because of a communication error, a connection refusal by a user, and the like. And so, as described in detail later, the first communication apparatus 100 and the second communication apparatus 200 according to the present embodiment provide a scheme which notifies a user of various states of progress such as success, failure, during attempt of the handover and so on.

[2] Basic Configuration Example of Communication Apparatuses

Next, basic configuration examples of the first communication apparatus 100 and the second communication apparatus 200 will be described using FIGS. 2 to 4.

Figure 2:
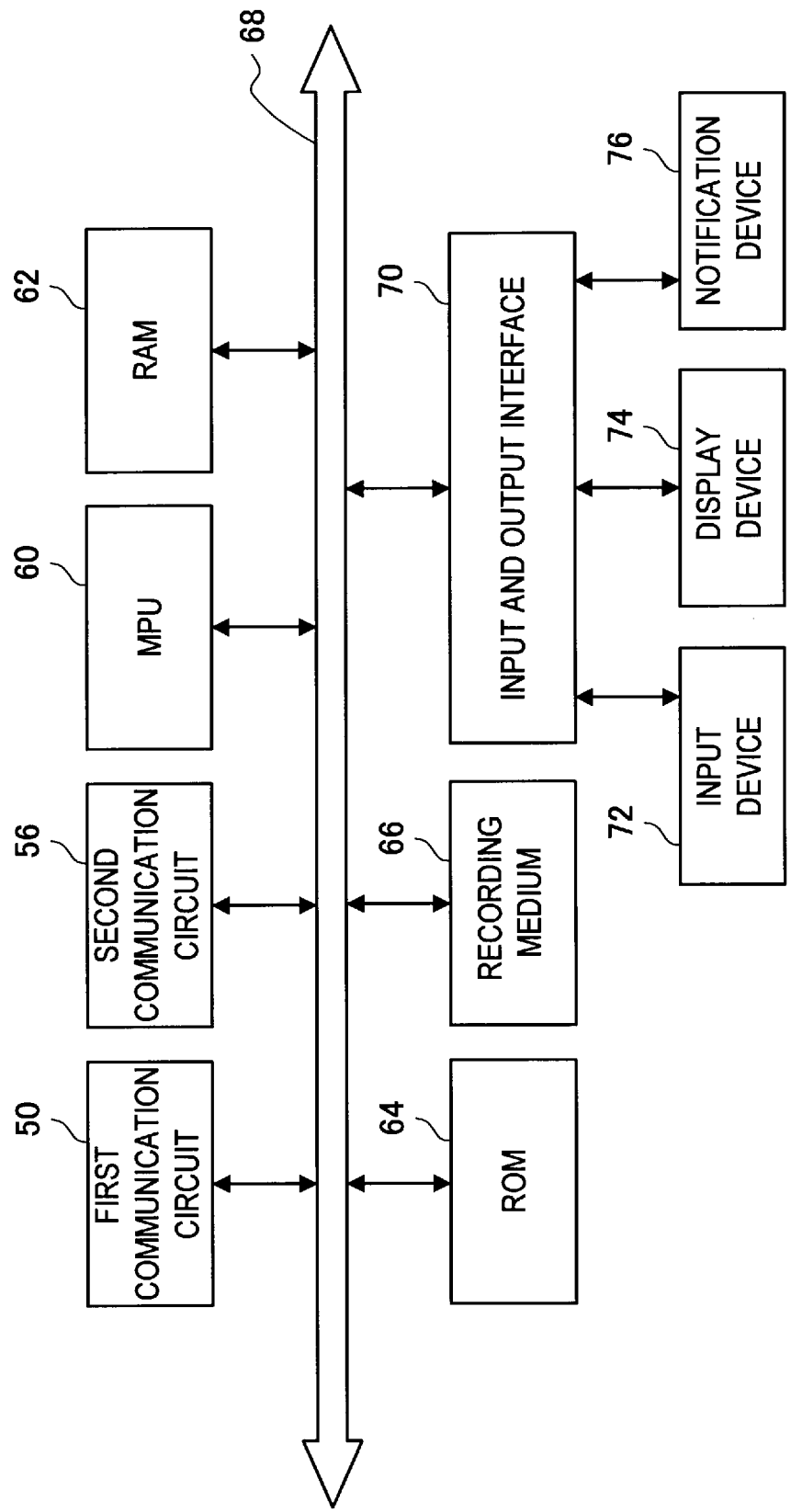
FIG. 2 is a block diagram showing a hardware configuration of a first communication apparatus and a second communication apparatus according to an embodiment.

FIG. 2 is an illustrative diagram showing an example of a hardware configuration of the first communication apparatus 100 according to an embodiment. Referring to FIG. 2, the first communication apparatus 100 includes a first communication circuit 50, a second communication circuit 56, an MPU (micro processing unit) 60, a RAM (random access memory) 62, a ROM (read only memory) 64, a recording medium 66, an input and output interface 70, an input device 72, display device 74 and a notification device 76. In addition, these constituent elements are connected with each other by a bus 68 serving as a data transmission path.

The first communication circuit 50 is a device provided in order that the first communication apparatus 100 performs communication by a first communication method. As the first communication method, for example, in the case of using the NFC method, the first communication circuit 50 includes a resonance circuit having predetermined inductance and capacitance, a demodulation circuit which demodulates a signal received by the resonance circuit, and a transmission circuit which amplifies a carrier wave and transmits it from the resonance circuit. Alternatively, the first communication circuit 50 may be, for example, an infrared port and the like according to the IrDA (Infrared Data Association) standards.

The second communication circuit 56 is a device provided in order that the first communication apparatus 100 performs communication by the second communication method. The second communication circuit 56 may be, for example, a BT port according to standard specifications by IEEE 802.15.1, or a wireless LAN port and the like according to standard specifications such as IEEE 802.11a, b, g, and n. In addition, a plurality of the second communication circuits 56 according to different types of communication methods may be provided in the first communication apparatus 100.

The MPU 60 serves as a control unit which controls the whole of the first communication apparatus 100. The RAM 62 temporarily stores, for example, programs, data, and the like executed and used by the MPU 60. In addition, the ROM 64 stores, for example, control data such as programs, and process parameters, which are used by the MPU 60.

The recording medium 66 is configured, for example, using a magnetic recording medium such as a hard disk and a non-volatile memory such as a flash memory. The recording medium 66 stores data such as setting information, authentication information, and application information of the first communication apparatus 100, various types of programs, and the like.

The input and output interface 70 connects, for example, the bus 68 with the input device 72, the display device 74, and the notification device 76. As the input and output interface 70, for example, a USB (Universal Serial Bus) terminal, a DVI (Digital Visual Interface) terminal, and the like can be used.

The input device 72 is configured, for example, using a button, a direction key, a joystick, a keyboard, a mouse, and the like, and accepts an operation from a user. The display device 74 is configured, for example, using a CRT (Cathode Ray Tube), a liquid crystal display, an organic LED (Organic Electro-Luminescence) display, and the like, and displays information to the user.

The notification device 76 may be an arbitrary device which stimulates user's sensory organs. For example, if a LED (light emitting diode) is used, it is possible to notify by stimulating a user's visual sense with blinking patterns, displayed colors, and the like. In addition, for example, if speakers, bells, and the like are used, it is possible to notify by stimulating a user's acoustic sense with sonant patterns, musical scales, rhythms, and the like. Further, if a vibrator by an eccentric motor and the like is used, it is possible to notify by stimulating a user's tactile sense with vibration patterns, vibration intensities, and the like.

The hardware configuration of the first communication apparatus 100 according to an embodiment using FIG. 2 has been described so far. In the present embodiment, the hardware configuration of the second communication apparatus 200 is also configured as shown in FIG. 2.

Figure 3:
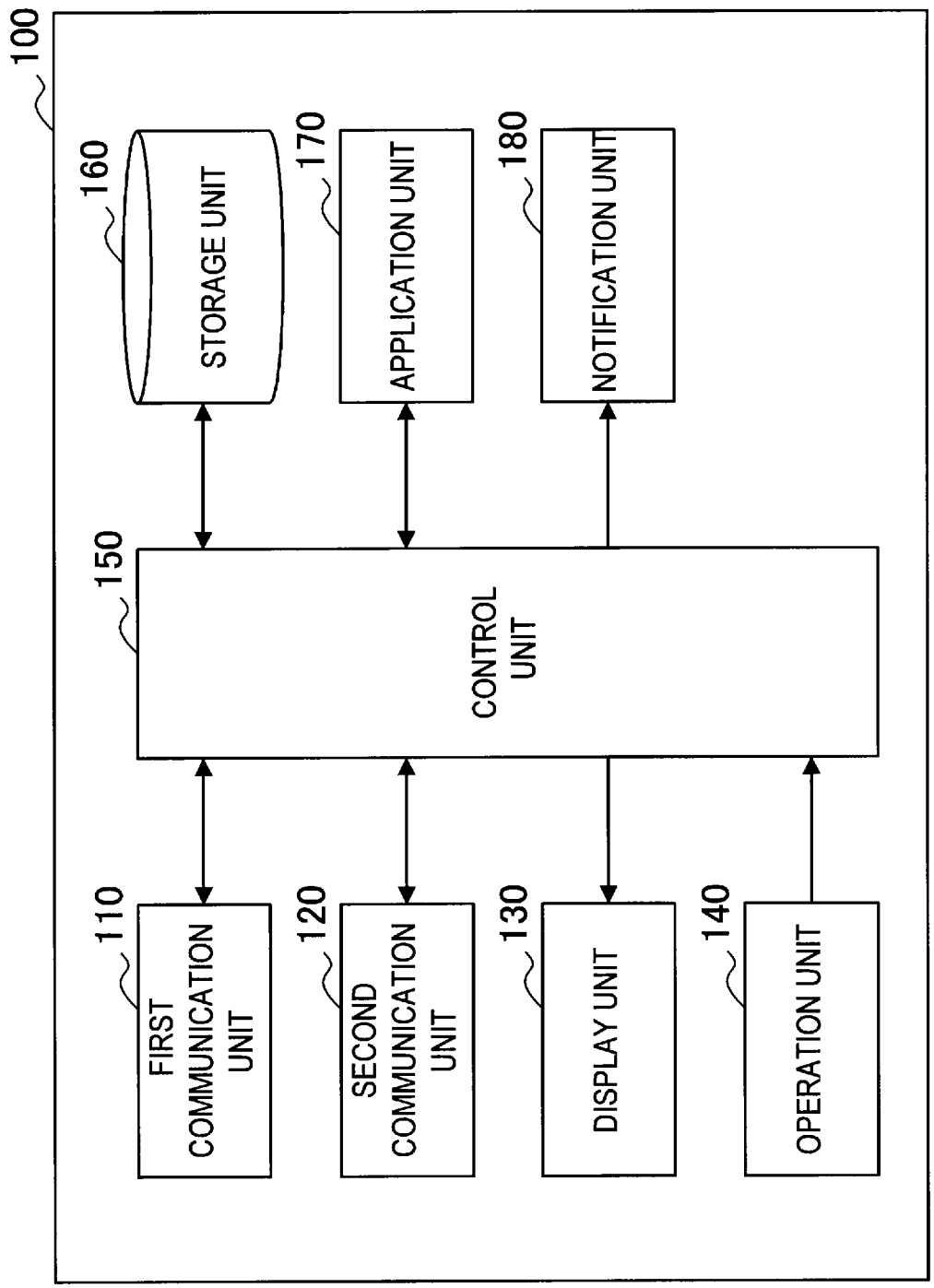
FIG. 3 is a block diagram showing a logical configuration of the first communication apparatus according to an embodiment.

Next, FIG. 3 is a block diagram showing a logical configuration of the first communication apparatus 100 in the present embodiment.

Referring to FIG. 3, the first communication apparatus 100 includes a first communication unit 110, a second communication unit 120, a display unit 130, an operation unit 140, a control unit 150, a storage unit 160, an application unit 170, and a notification unit 180.

The first communication unit 110 mediates communication with the second communication apparatus 200 by the first communication method using the first communication circuit 50 described using FIG. 2. In the present embodiment, the first communication unit 110 of the first communication apparatus 100 transmits a request signal (request message) which requests start of communication via the second communication unit to be described later to the second communication apparatus 200 in response to an instruction from the control unit 150. That is, in the present embodiment, the first communication apparatus 100 becomes a terminal on the side of requesting handover. After that, a response signal (select message) returned from the second communication apparatus 200 in response to the request signal is received, and then, the communication via the second communication unit 120 is started.

The second communication unit 120 mediates communication with the second communication apparatus 200 by the second communication method using the second communication circuit 56 described using FIG. 2. As the second communication method, for example, the BT method, the wireless LAN system, and the like are used as described before. In the case where the communication using the second communication method is started by the second communication unit 120, a specific authentication process is performed between the second communication unit 120 and the communication party.

The display unit 130 displays text information and image information output from the control unit 150, for example, to a user using the display device 74 described using FIG. 2. The operation unit 140 generates an input signal corresponding to each operation and outputs it to the control unit 150 when a user performs, for example, operation for starting handover, accepting a connection, and the like with the input device 72 described using FIG. 2.

The control unit 150 is connected to the first communication unit 110, the second communication unit 120, the display unit 130, the operation unit 140, the storage unit 160, the application unit 170, and the notification unit 180, and controls function of each constituent element. The control unit 150 mainly uses the MPU 60, the RAM 62, and the ROM 64 described using FIG. 2.

For example, when the control unit 150 receives the input signal indicating that a handover start is designated from the operation unit 140, the control unit 150 transmits a request signal which requests a handover from the first communication unit 110. Then, after a response signal in response to the transmitted request signal from, for example, the second communication apparatus 200 is received, the control unit 150 determines whether a communication with the second communication apparatus 200 via the second communication unit 120 is possible or not based on setting information and the like included in the received response signal.

In this case, as the setting information, for example, information related to address information for the second communication method and an authentication system to be supported, information related to applications provided within each device, or the like are contained in the response signal. Therefore, with the setting information, the control unit 150 can confirm whether or not the first communication apparatus 100 can use, for example, the authentication system supported by the second communication apparatus 200, whether or not the second communication apparatus 200 has, for example, an application which is in common with the first communication apparatus 100, or the like. In addition, in the case where connection availability information is contained in the response signal, the control unit 150 can determine whether or not the connection is allowed using the connection availability information.

Then, the control unit 150 further transmits authentication information from the second communication unit 120 to the second communication apparatus 200 in the case where it is determined that the communication with the second communication apparatus 200 via the second communication unit 120 is possible. In this case, the authentication information transmitted by the second communication unit 120 includes, for example, public keys, certificates, and the like in the public key cryptosystem which is adopted in the standards such as the BT and the wireless LAN. This allows the second communication apparatus 200 to start communication with guaranteed security through an authentication process with the first communication apparatus 100.

The storage unit 160 stores, for example, a program executed by the control unit 150 and the application unit 170, or data such as setting information necessary for communication via the first communication unit 110 or the second communication unit 120, using the recording medium 66 described using FIG. 2.

The application unit 170 mainly uses the MPU 60, the RAM 62, and the ROM 64 described using FIG. 2, similarly to the control unit 150. The application unit 170 provides a user with an arbitrary application service using communication function between the first communication apparatus 100 and the second communication apparatus 200. Among these services, services which require exchanging data of which data size exceeds a certain capacity, such as data sharing services of image data and music data or data backup services are performed using the second communication method via the second communication unit 120 through a handover process to be described later.

The notification unit 180 is configured using the notification device 76 described using FIG. 2. For example, the notification unit 180 notifies a user of states of progress such as success, failure, or during attempt of the handover with the second communication apparatus 200 based on an instruction from the control unit 150. In this case, the notification unit 180 may use a plurality of different notification patterns depending on the state of progress of the handover process.

The notification patterns may be identified, for example, by illuminating colors, the amount of light, blinking intervals, and the like in the case where the notification device 76 is a light emitting device such as LEDs. Further, the notification patterns may be identified, for example, by musical scales, sound volume, rhythms, and the like in the case of an audio output unit such as speakers. Furthermore, the notification patterns may be identified, for example, by vibration intensities, intervals, and the like in the case of a vibration device such as vibrators.

A flow of a series of the handover process and the notification process performed and controlled by the control unit 150 will be further described in detail in the following section.

Figure 4:
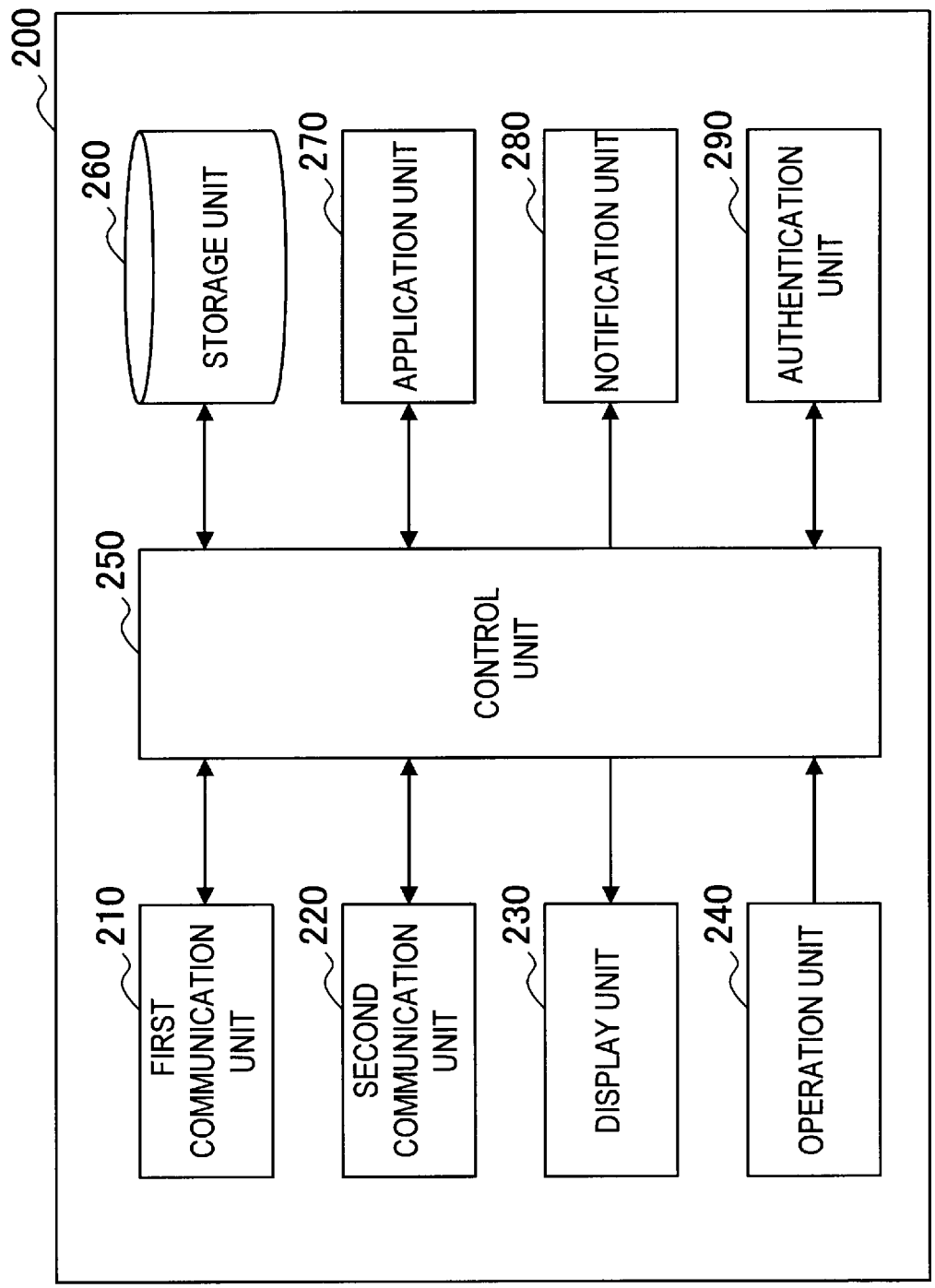
FIG. 4 is a block diagram showing a logical configuration of the second communication apparatus according to an embodiment.

Next, FIG. 4 is a block diagram showing a logical configuration of the second communication apparatus 200 in the present embodiment.

Referring to FIG. 4, the second communication apparatus 200 includes a first communication unit 210, a second communication unit 220, a display unit 230, an operation unit 240, a control unit 250, a storage unit 260, an application unit 270, a notification unit 280, and an authentication unit 290. Herein, the functions similar to the first communication unit 110, the second communication unit 120, the display unit 130, the operation unit 140, the storage unit 160, the application unit 170, and the notification unit 180 of the first communication apparatus 100 described above using FIG. 3 will not be repeated.

The first communication unit 210 of the second communication apparatus 200 mediates communication by the above first communication method with the first communication apparatus 100. In the present embodiment, the first communication unit 210 of the second communication apparatus 200 receives a request signal transmitted from the first communication apparatus 100 for starting communication via the second communication unit. Then, the first communication unit 210 transmits a response signal to the first communication apparatus 100 in response to an instruction from the control unit 250. That is, in the present embodiment, the second communication apparatus 200 becomes a terminal on the side of responding to the handover request.

On the other hand, the second communication unit 220 of the second communication apparatus 200 mediates communication by the above second communication method with the first communication apparatus 100, using the second communication circuit 56.

When the above request signal transmitted from the first communication apparatus 100 is received by the first communication unit 210, the control unit 250 obtains, for example, setting information and the like such as address information for the above second communication method from the storage unit 260. Then, the control unit 250 makes the first communication unit 210 transmit the response signal including the obtained setting information to the first communication apparatus 100.

After that, when authentication information, which is for authenticating communication by the second communication method, transmitted from the first communication apparatus 100 is received by the second communication unit 220, the control unit 250 receives and transmits the authentication information to the authentication unit 290 and requests to perform an authentication. Then, the control unit 250 makes the second communication unit 220 transmit the authentication result output by the authentication unit 290 to the first communication apparatus 100.

In this case, in the present embodiment, authentication by the authentication unit 290 can be performed in accordance with an arbitrary authentication system or standard specifications such as, for example, EAP-TLS (EAP-Transport Layer Security) or PEAP (Protected EAP).

In the present embodiment, an example that an authentication request is sent from the first communication apparatus 100 to the second communication apparatus 200 when a handover is performed. However, alternatively, an authentication request may be sent from the second communication apparatus 200 to the first communication apparatus 100. In that case, function equivalent to the authentication unit 290 is additionally provided to a logical configuration of the first communication apparatus 100 shown in FIG. 3.

So far, an example of the hardware configuration and the logical configurations of the first communication apparatus 100 and the second communication apparatus 200 have been described using FIGS. 2 to 4. Next, an example of a handover process flow and a notification process, performed between the first communication apparatus 100 and the second communication apparatus 200 with such configurations will be described.

[3] Example of Handover Process Flow and Notification Process

[3-1] Typical Flow

FIG. 5 is a sequence diagram showing an example of the handover process flow which is performed between the first communication apparatus 100 and the second communication apparatus 200.

In the example shown in FIG. 5, first, a user performs a specific operation on the first communication apparatus 100, and accordingly, the handover process is started (S302). For example, the first communication apparatus 100 may start the handover process when a specific button of the operation unit 140 is pressed.

Next, the control unit 150 of the first communication apparatus 100 makes the first communication unit 110 transmit a request signal for starting communication by the second communication method, that is, for starting a handover to the second communication apparatus 200 (S304). Herein, for example, in the case of the NFC method, a communication range (first communication range) of the first communication unit 110 is a range of an adjacent distance such as approximately 10 cm. Consequently, for example, the display unit 130 of the first communication apparatus 100 displays a screen which induces a user to bring (touch) the first communication apparatus 100 close to the second communication apparatus 200. This makes the user touch the first communication apparatus 100 to the second communication apparatus 200, and the request signal for the handover transmitted from the first communication unit 110 reaches the second communication apparatus 200.

The request signal of the handover which has reached the second communication apparatus 200 is received by the first communication unit 210 of the second communication apparatus 200. Then, the control unit 250 of the second communication apparatus 200 makes the first communication unit 210 transmit the response signal including setting information and the like for authentication of communication by the second communication method to the first communication apparatus 100 as a response to the received request signal (S306).

In the first communication apparatus 100, when the response signal transmitted from the second communication apparatus 200 is received, the control unit 150 of the first communication apparatus 100 makes the notification unit 180 notify the user that the touch has been succeeded (H1). This enables the user to recognize that he or she may move the first communication apparatus 100 away from the second communication apparatus 200. Such notification is not limited to notification by sound as shown in FIG. 5. For example, the notification may be performed by LED blinking, vibrator vibration, and the like. In addition, notification patterns may be changed depending on types of application to be connected and the like.

Herein, a sequence of handover request and response of S304 and S306 is not limited to the case where the sequence is completed with one request/response reciprocation as shown in FIG. 5. In the case where S304 and S306 are repeated plural times, for example, it can be determined that a time point at which a communication completion command of the first communication method is finally received is a time point at which the touch has been succeeded.

After that, in the second communication apparatus 200, for example, operation admitting the handover is performed by the user (S308). For example, the display unit 230 of the second communication apparatus 200 displays a screen for asking a user whether the handover is to be admitted or not, and the operation for admission or refusal by the user may be accepted by the operation unit 240. Herein, in the case where setting which automatically admit the handover is given in advance, S308 may be omitted and a subsequent process may be automatically proceeded without asking a user about admission.

Meanwhile, after S306, the control unit 150 of the first communication apparatus 100 makes the second communication unit 120 transmit authentication information for authentication of communication by the second communication method. Typically, after S306, the authentication information is recurrently transmitted from the second communication unit 120 until the authentication result is replied from the second communication apparatus 200 or a certain time has been passed and time out occurs (S310). During that time, for example, a screen of "during connection (connecting . . . )" showing that authentication by the present second communication method is attempted is displayed on the display unit 130 of the first communication apparatus 100.

After that, in the second communication apparatus 200 in which the handover is admitted by the user, the control unit 250 requests the authentication unit 290 to perform an authentication using the received authentication information after the second communication unit 220 receives the authentication information (S312). Then, the control unit 250 transmits the authentication result output by the authentication unit 290 from the second communication unit 220 to the first communication apparatus 100 (S314).

In the first communication apparatus 100, when the authentication result is received from the second communication apparatus 200 as a response to the authentication request, the control unit 150 of the first communication apparatus 100 makes the notification unit 180 notify the user that the authentication is performed (H2). This makes the user aware that the handover has succeeded or failed.

After that, for example, basic information that is not application-specific information is exchanged between the first communication apparatus 100 and the second communication apparatus 200 using the second communication method (S316). In this case, the basic information includes, for example, profile information and the like of a user who uses each device.

Further, after exchanging the basic information, application-specific detail information is exchanged between the second communication units 120 and 220 (S318). In this case, the control unit 150 of the first communication apparatus 100 or the control unit 250 of the second communication apparatus 200 may be further determined whether or not it is possible to start an application based on the exchanged detail information of applications.

Then, after exchanging the detail information of applications, under communication environment with guaranteed security, application service provision using the second communication method is started (S320).

[3-2] Modified Embodiment

The handover process flow and typical notification process have been described in FIG. 5. However, in the present embodiment, various notification processes by different patterns or different timings from those of FIG. 5 can be achieved. Hereinafter, a modified embodiment of a notification process will be described using FIGS. 6 to 15.

In FIG. 6, notification is continuously performed (H3) after transmission of a handover request signal from the first communication unit 110 of the first communication apparatus 100 is started (S304) until a response signal from the second communication apparatus 200 is received (S306). Such notification which continues for a certain period of time can be performed, for example, by repetition of sonant, by repetition of LED illumination or blinking, or the like. That makes the user recognize that it is necessary to keep touching during the notification.

In FIG. 7, in the case where the control unit 150 determines that communication with the second communication apparatus 200 is not able to be started based on a response signal when the response signal is replied from the second communication apparatus 200 (S307), notification indicating that the handover has failed is performed (H4). For example, in the case where the capability of the first communication apparatus 100 and the second communication apparatus 200 is unmatched or in the case where connection availability information indicating that handover is refused is included in the response signal, it can be determined that the handover has failed. As an example in which capabilities are unmatched may be a case of no existence of corresponding application, a variance of version, lack of a necessary device or a control profile, or the like. Causes of such handover failure may be notified to a user by using different notification patterns. That makes a user to be able to recognize the causes and the like in the case of success or failure of handover without paying particular attention to, for example, a display unit 130.

In FIG. 8, in the case that there is no response from the second communication apparatus 200 even when a predetermined period of time has passed after transmission of the handover request signal from the first communication unit 110 is started (S304), notification representing that request has failed because of time out is performed (H5). In such a case, notification may be performed in a form that can enable the user to recognize the type of failure by using a different notification pattern from the notification (H4) shown in FIG. 7. In addition, as described above, in the case where S304 and S306 are repeated plural times, for example, when a communication completion command is not confirmed even if the predetermined period of time has passed, notification showing the same time out as H5 may be performed.

In FIG. 9, after the handover request (S304) and response (S306), in the case where operation for admitting or refusing the handover is performed by the user on the second communication apparatus 200 (S308), notification representing that the handover is admitted or refused is performed (H6). Such notification is performed, for example, by giving an instruction from the control unit 250 to the notification unit 280 of the second communication apparatus 200. In addition, notification may be performed in different patterns depending on whether the handover is admitted or refused.

In FIG. 10, in the case where the control unit 150 determines that authentication is failed when the authentication result of the communication by the second communication method is replied from the second communication apparatus 200 (S315), notification which represents authentication failure is performed (H7).

In FIG. 11, in the case where the authentication result is not replied from the second communication apparatus 200 even when the predetermined period of time has passed after the authentication request from the second communication unit 120 is transmitted (S310), notification which represents that the authentication is failed with time out is performed (H8). In such a case, notification may be performed in the form that types of the authentication failure can be recognized using a different notification pattern from the notification (H7) which represents the authentication failure shown in FIG. 10. That makes the user to be able to recognize causes of not only success or failure of the authentication, but also the cause of authentication failure.

In addition to S310, in the case where there is no response from a communication party during the predetermined period after executing respective steps such as S314, S316, and S318 shown in FIG. 5, notification related to the same time out may be performed.

Figure 12:
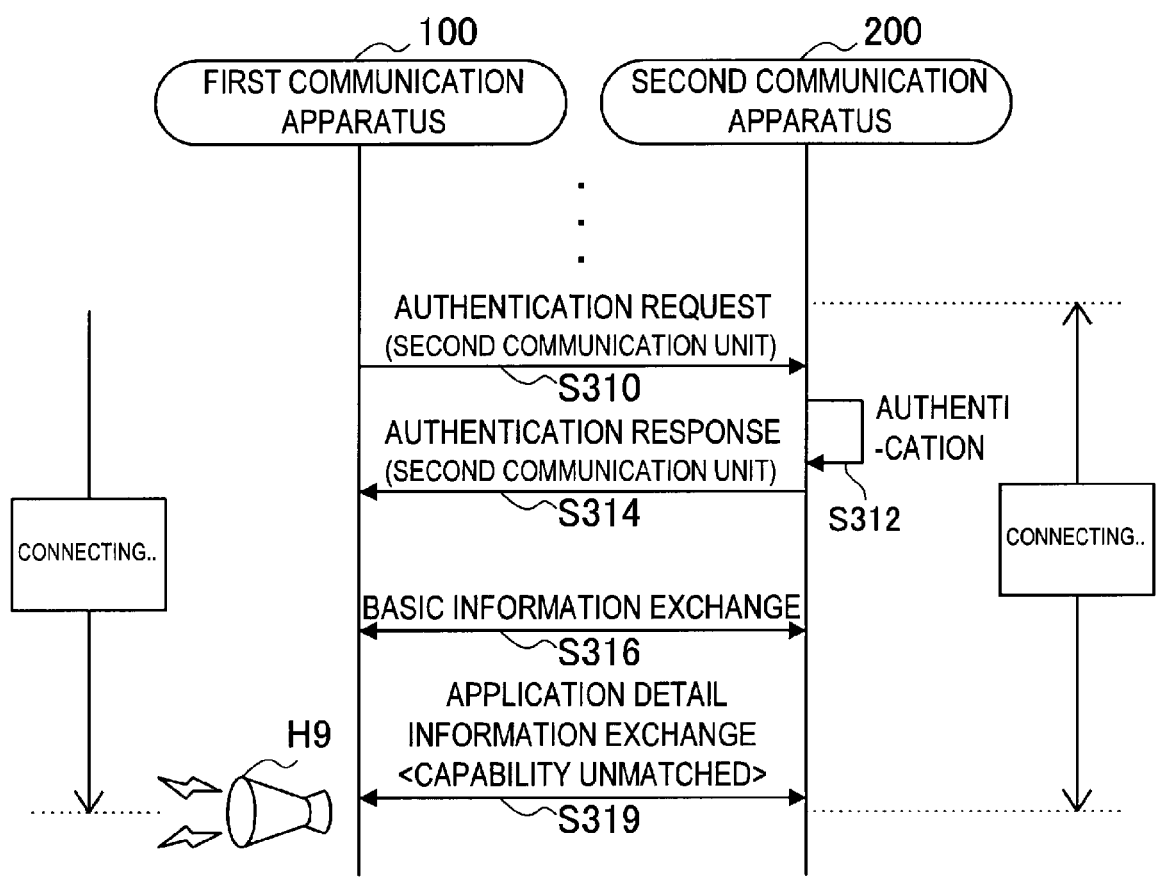
FIG. 12 is a sequence diagram showing a further different example of the notification process.

In FIG. 12, in the case where it is turned out that capabilities of applications are unmatched (S319) after the basic information and detail information of applications are exchanged between the first communication apparatus 100 and the second communication apparatus 200 (S316), notification is performed (H9).

Figure 13:
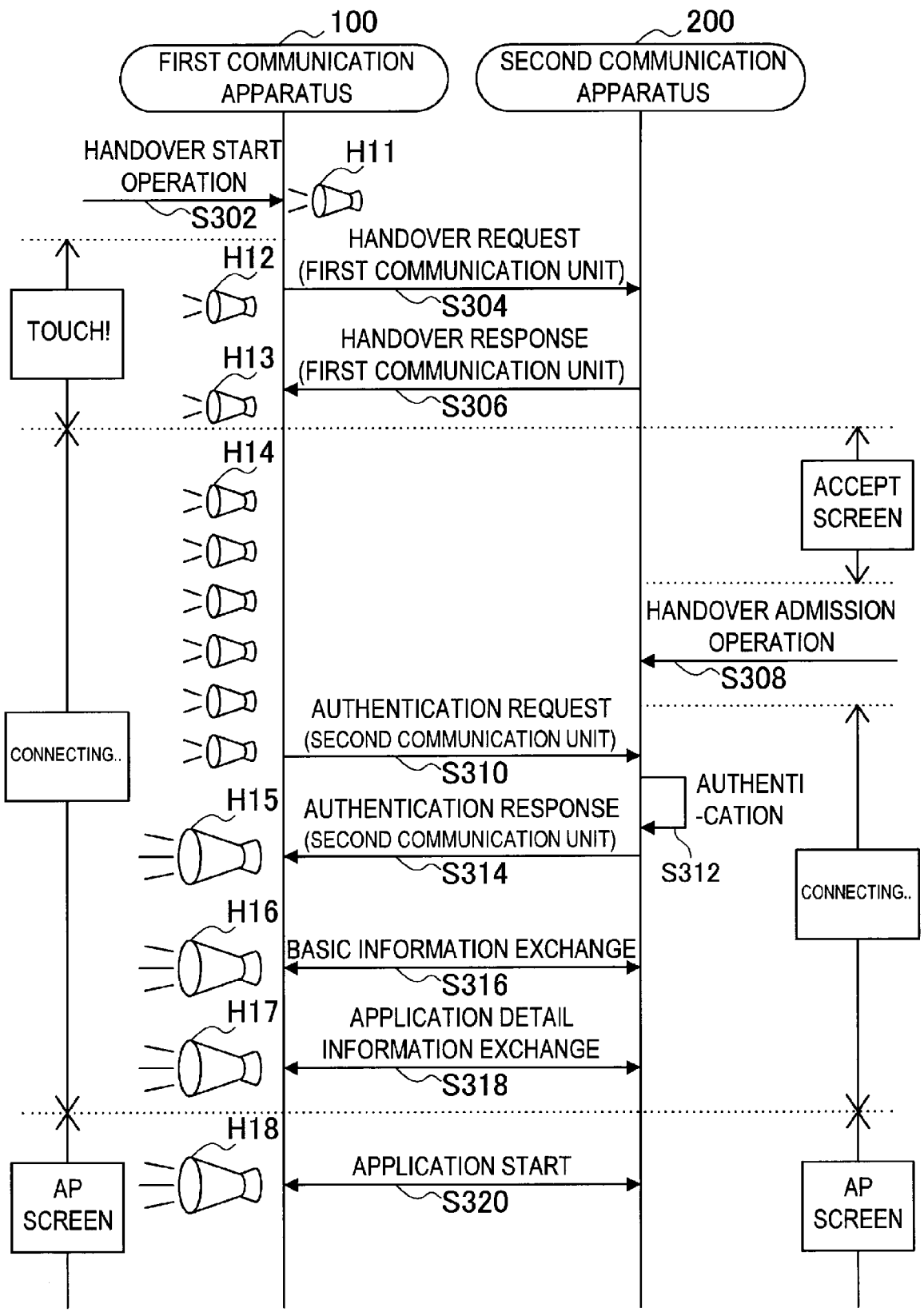
FIG. 13 is a sequence diagram showing a further different example of the notification process.

FIG. 13 shows an example in which states of progress of the handover process shown in FIG. 5 is notified each time the state changes. In FIG. 13, each notification is performed on handover start operation (S302 and H11), on handover request (S304 and H12), on handover response (S306 and H13), during authentication request (S310 and H14), on authentication response (S314 and H15), on basic information exchange (S316 and H16), on application detail information exchange (S318 and H17), and on application start (S320 and H18).

Figure 14:
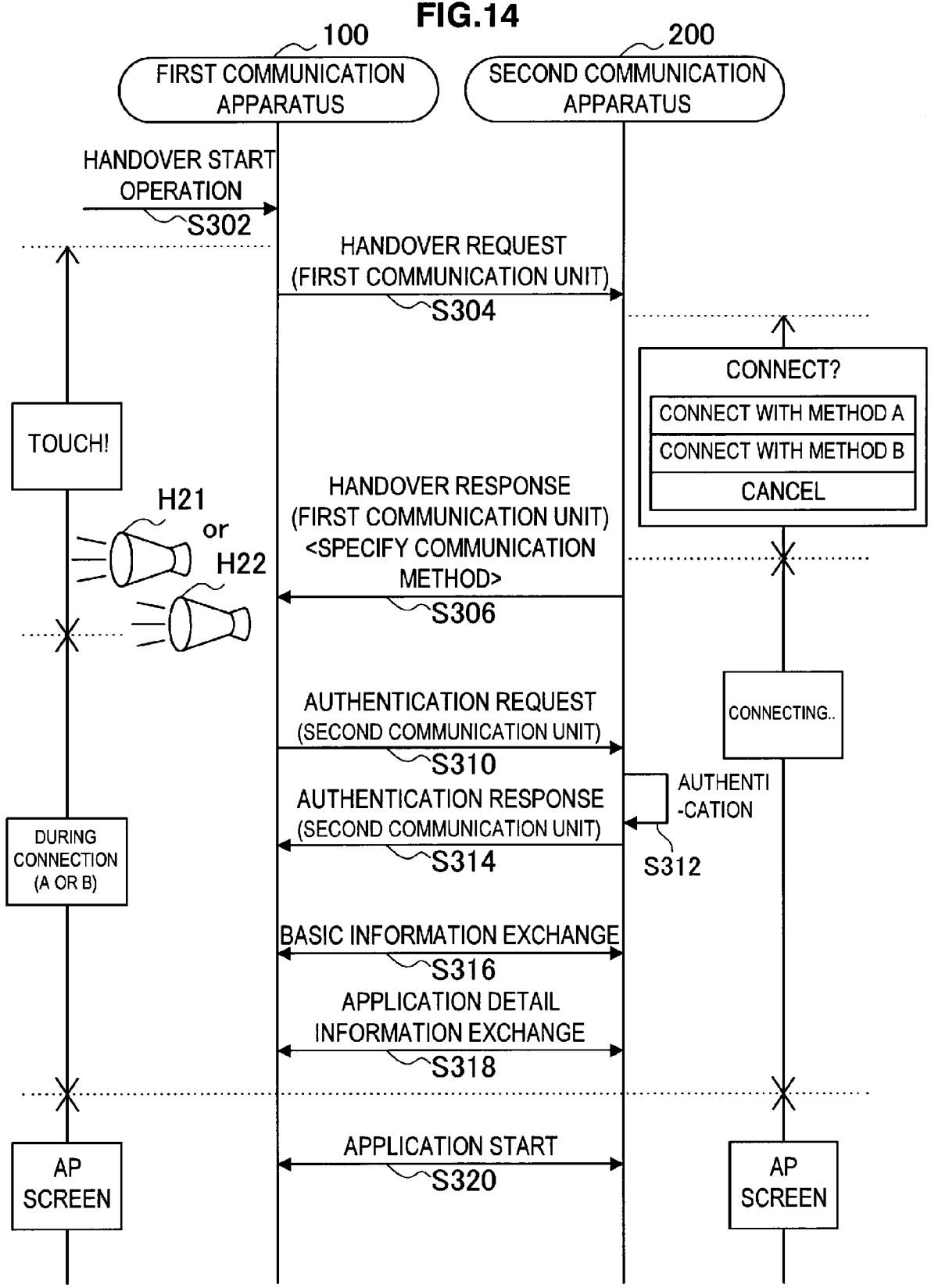
FIG. 14 is a sequence diagram showing a further different example of the notification process.

In addition, as described in connection with the description of the second communication circuit 56 shown in FIG. 2, there is a case where a plurality of types of the second communication methods are used between the first communication apparatus 100 and the second communication apparatus 200. In that case, as shown in FIG. 14, in the second communication apparatus 200 in which a request signal of handover from the first communication apparatus 100 is received, it is possible to let a user select the second communication method which is to be handover target from a plurality of candidates. In FIG. 14, as an example, two options including communication methods A and B are shown on the screen. For example, in FIG. 14, the communication method A may be a BT method and the communication method B may be a Wi-Fi method or the like.

In the example shown in FIG. 14, information which specifies a communication method selected by the user is included in a response signal replied from the second communication apparatus 200 (S306). The first communication apparatus 100 which receives such response signal may perform different notification patterns depending on the specified communication method, for example, in a manner of H21 in the case where the BT method is specified or in a manner of H22 in the case where the Wi-Fi method is specified.

Herein, in FIG. 14, the example of letting the user select the second communication method is shown, however, alternatively, the second communication method may be automatically selected by the first communication apparatus 100 or the second communication apparatus 200 according to previously set priority or the like.

In addition, in proximity communication such as the NFC used as the first communication method, a device served as a reader/writer outputs a carrier wave to detect a communication party. In the present embodiment, the second communication apparatus 200 serves as the reader/writer. Then, there is a case where the carrier wave is triggered to start outputting or is constantly output. Consequently, the notification unit 280 may notify the user whether or not the carrier wave is being output from the second communication apparatus 200.

Figure 15:
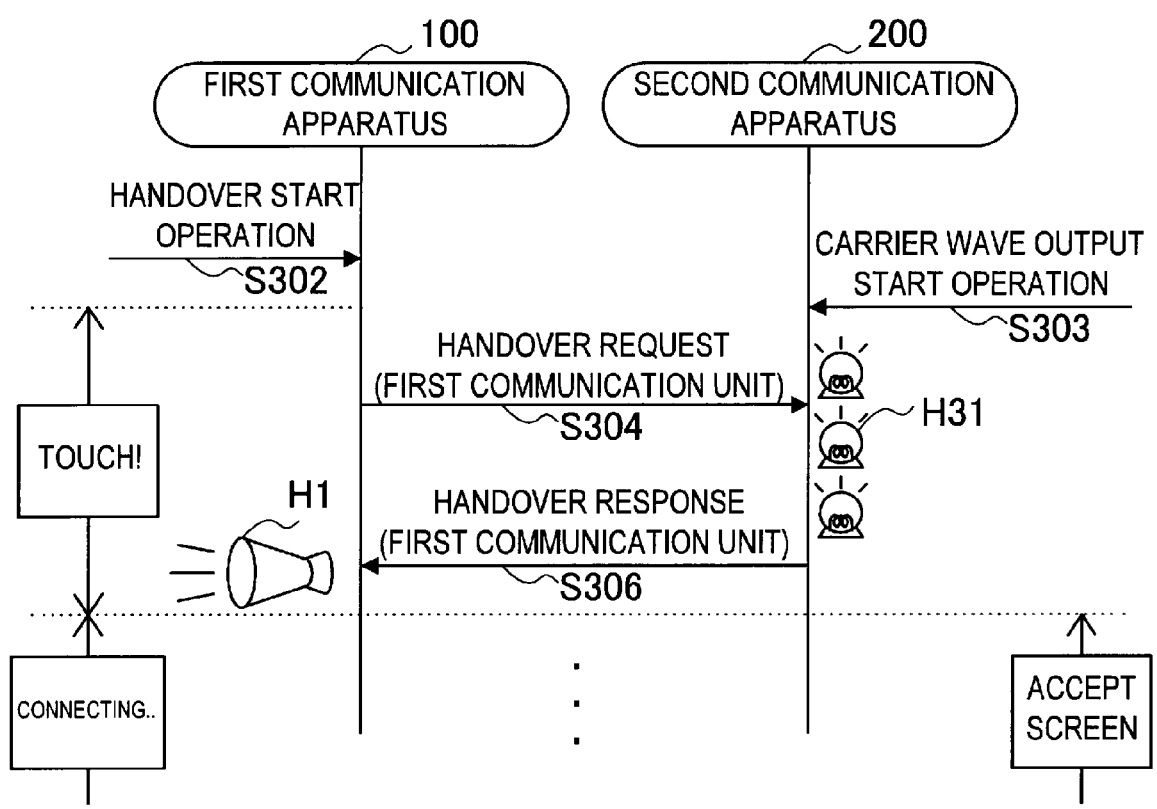
FIG. 15 is a sequence diagram showing a further different example of the notification process.

In FIG. 15, triggered by a user's operation for starting outputting a carrier wave, the output of the carrier wave is started from the first communication unit 210 of the second communication apparatus 200 (S303), and notification is performed during the carrier wave is being output (H31). That enables the user to recognize the time at which it makes the first communication apparatus 100 touch the second communication apparatus 200.

Examples of the handover process flow and the notification process according to an embodiment have been described so far using FIGS. 5 to 15. Herein, the examples that notifications are performed using the notification unit 180 of the first communication apparatus 100 have been shown by the respective drawings except for FIGS. 9 and 15. However, notifications may be performed using the notification unit 280 of the second communication apparatus 200 at the notification timing shown in each drawing. In addition, it is possible to notify using both the first communication apparatus 100 and the second communication apparatus 200. In this regard, however, in order to avoid user's confusion, it is preferable that notification related to the handover process is performed while maintaining sensation of unity, for example, the notification is performed by only one device on the side of requesting/responding.

According to the present embodiment, it is possible to make a user appropriately recognize a state of progress of handover without making the user pay particular attention to a screen. In addition, the state of progress of the handover can be expressed even with a communication apparatus in which a display screen is not provided. This improves convenience of secure and seamless communication utilizing the handover, and utilization of proximity communication and short-distance communication in more multiple scenes is expected.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A communication apparatus comprising:
a first communication unit having a first communication range;
a second communication unit having a second communication range wider than the first communication range;
a control unit which transmits a request signal for starting communication via the second communication unit from the first communication unit to another communication apparatus, and
transmits authentication information from the second communication unit to the another communication apparatus in the case where it is determined that communication with the another communication apparatus via the second communication unit is possible based on a response signal after the first communication unit receives the response signal in response to the request signal; and
a notification unit which notifies a user after the second communication unit receives a result of authentication based on the authentication information, and notifies the user after the response signal in response to the request signal is received by the first communication unit.

2. The communication apparatus according to claim 1, wherein the notification unit continuously notifies the user after the request signal is transmitted from the first communication unit to the another communication apparatus until the response signal in response to the request signal is received by the first communication unit.

3. The communication apparatus according to claim 1, wherein the notification unit notifies the user in different notification patterns depending on availability of communication with the another communication apparatus via the second communication unit, the availability of the communication being determined by the control unit.

4. The communication apparatus according to claim 1, wherein the notification unit continuously notifies the user after the authentication information is transmitted from the second communication unit to the another communication apparatus until the result of the authentication based on the authentication information is received by the second communication unit.

5. The communication apparatus according to claim 1, wherein the notification unit notifies the user in different notification patterns depending on whether the authentication based on the authentication information succeeded or not or depending on the type of success or failure of the authentication.

6. The communication apparatus according to claim 1, further comprising an application unit which provides the user with an application service using communication with the another communication apparatus via the second communication unit in the case where the authentication based on the authentication information succeeds, and wherein the notification unit notifies the user in the case where the provision of the application service is started by the application unit.

7. The communication apparatus according to claim 6, wherein the notification unit notifies the user in the case where the provision of the application service is by the application unit is not able to be started due to an error after the authentication based on the authentication information succeeds.

8. The communication apparatus according to claim 1, wherein the notification unit notifies the user in different notification patterns depending on a communication method specified in the response signal after the response signal in response to the request signal is received by the first communication unit.

9. The communication apparatus according to claim 1, wherein the notification unit notifies the user with at least one of blinking patterns, displayed colors, sonant patterns, musical scales, rhythms, vibration patterns and vibration intensities.

10. A communication apparatus comprising:
a first communication unit having a first communication range;
a second communication unit having a second communication range wider than the first communication range;
a control unit which transmits a response signal in response to a request signal from the first communication unit to another communication apparatus after the first communication unit receives the request signal for starting communication via the second communication unit from the another communication apparatus, and
transmits a result of authentication based on authentication information from the second communication unit to the another communication apparatus after the second communication unit receives the authentication information from the another communication apparatus;
an authentication unit which authenticates the communication with the another communication apparatus via the second communication unit based on the authentication information and outputs the result of the authentication; and
a notification unit which notifies a user after the authentication is performed by the authentication unit based on the authentication information, and notifies the user after the first communication unit receives the request signal from the another communication apparatus.

11. The communication apparatus according to claim 10, wherein the notification unit continuously notifies the user during a carrier wave for detecting a communication party is output from the first communication unit.

12. The communication apparatus according to claim 10, wherein the notification unit notifies the user in different notification patterns depending on whether the authentication performed by the authentication unit based on the authentication information succeeded or not or depending on the type of success or failure of the authentication.

13. The communication apparatus according to claim 10, further comprising an operation unit which accepts an operation indicating whether or not communication via the second communication unit is admitted after the response signal is transmitted by the first communication unit, and wherein the notification unit notifies the user after the operation unit accepts the operation which admits the communication via the second communication unit.

14. A communication system comprising a communication apparatus of the request side and a communication apparatus of the response side, the communication apparatus of the request side including:
a first communication unit of the request side having a first communication range;
a second communication unit of the request side having a second communication range wider than the first communication range;
a control unit of the request side which transmits a request signal for starting communication via the second communication unit of the request side from the first communication unit of the request side to the communication apparatus of the response side, and
transmits authentication information from the second communication unit of the request side to the communication apparatus of the response side in the case where it is determined that communication with the communication apparatus of the response side via the second communication unit of the request side is possible based on a response signal after the first communication unit of the request side receives the response signal in response to the request signal; and
a notification unit of the request side which notifies a user after the second communication unit of the request side receives a result of authentication based on the authentication information, and notifies the user after the response signal in response to the request signal is received by the first communication unit, and
the communication apparatus of the response side including:
a first communication unit of the response side capable of communicating with the first communication unit of the request side;
a second communication unit of the response side capable of communicating with the second communication unit of the request side; and
a control unit of the response side which transmits the response signal from the first communication unit of the response side to the communication apparatus of the request side after the first communication unit of the response side receives the request signal from the communication apparatus of the request side, and
transmits the result of the authentication based on the authentication information from the second communication unit of the response side to the communication apparatus of the request side after the second communication unit of the response side receives the authentication information from the communication apparatus of the request side.

15. A notification method comprising:

transmitting a request signal for starting communication by a second communication method having a second communication range wider than a first communication range using a first communication method having the first communication range from a first communication apparatus to a second communication apparatus;

transmitting a response signal in response to the request signal from the second communication apparatus to the first communication apparatus;

determining whether or not the communication by the second communication method with the second communication apparatus is possible based on the response signal in the first communication apparatus;

transmitting authentication information from the first communication apparatus to the second communication apparatus in the case where it is determined that the communication by the second communication method is possible;

transmitting a result of authentication based on the authentication information from the second communication apparatus to the first communication apparatus; and carrying out a notification for a user after receiving the result of the authentication based on the authentication information in the first communication apparatus, and carrying out a notification for the user after the response signal in response to the request signal is received by the first communication method.

16. A non-transitory computer readable storage medium storing a computer program product having instructions that when read by a CPU cause an information processing apparatus, which controls a communication apparatus including a first communication unit having a first communication range, a second communication unit having a second communication range wider than the first communication range, and a notification unit which carries out a notification for a user, to:

transmit a request signal for starting communication via the second communication unit from the first communication unit to another communication apparatus, transmit authentication information from the second communication unit to the another communication apparatus in the case where it is determined that communication with the another communication apparatus via the second communication unit is possible based on the response signal after the first communication unit receives a response signal in response to the request signal, and notify the user, via the notification unit, after the second communication unit receives a result of authentication based on the authentication information, and notify the user after the response signal in response to the request signal is received by the first communication unit.

17. A non-transitory computer readable storage medium storing a computer program product having instructions that when read by a CPU cause an information processing apparatus, which controls a communication apparatus including a first communication unit having a first communication range, a second communication unit having a second communication range wider than the first communication range, and a notification unit which carries out a notification for a user, to:

transmit a response signal in response to the request signal from the first communication unit to another communication apparatus after the first communication unit receives a request signal for starting communication via the second communication unit from the another communication apparatus, transmit a result of authentication based on the authentication information from the second communication unit to the another communication apparatus after the second communication unit receives authentication information from the another communication apparatus, and notify the user, via the notification unit, after performing the authentication based on the authentication information, and notify the user after the first communication unit receives the request signal from the another communication apparatus; and authenticate the communication with the another communication apparatus via the second communication unit based on the authentication information and output the result of the authentication.

* * * * *